২,৭৯৬,৪৩৭

DIVINYL DISULFIDE PREPARATION

Harold F. Park, East Longmeadow, Mass., assignor to Monsanto Chemical Company, St. Louis, Mo., a corporation of Delaware No Drawing. Application March 19, 1953, Serial No. 343,517

6 Claims. (Cl. 260—608)

This invention relates to new compositions of matter. More particularly, this invention relates to a new polymerizable difunctional disulfide, a process for preparing the same and polymeric derivatives thereof.

The organic sulfides and disulfides constitute a well-known class of organic compounds. The sulfides are characterized by the presence of only one sulfur atom whereas the disulfides contain two sulfur atoms that are directly linked to each other. The disulfide linkage ruptures with comparative ease and, as a result, special problems are encountered in the preparation and reaction of the organic disulfides. Although divinyl sulfide is a well-known compound that can be prepared by known methods, divinyl disulfide has not been prepared heretofore and there has been no known process which might be used to prepare this compound.

Accordingly, an object of the present invention is the provision of divinyl disulfide.

Another object is the provision of a process for preparing divinyl disulfide.

A further object is the provision of polymeric derivatives of divinyl disulfide.

These and other objects are attained by reacting a beta, beta'-dihalodiethyl disulfide with a hydroxide taken from the group consisting of alkali metal, alkaline earth metal and quaternary ammonium hydroxides in solution under controlled reaction conditions as hereinafter set forth in order to prepare divinyl disulfide. Polymeric derivatives of divinyl disulfide can then be prepared by known polymerization processes.

The following examples are given in illustration and are not intended as limitations on the scope of this invention. Where parts are mentioned, they are parts by weight.

PREPARATION OF DIVINYL DISULFIDE

Example I

Place 300 parts of anhydrous ethanol and 60 parts of potassium hydroxide in a suitable container and agitate until the potassium hydroxide dissolves in the ethanol. Adjust the temperature of the solution to about 20° C. and add 100 parts of beta,beta'-dichlorodiethyl disulfide with agitation, continuing the agitation for about 15 hours after the last of the disulfide has been added. At the end of this time remove the alcohol by vacuum distillation and wash the residue with ice water, using for this purpose three portions, each of which consists of about 150 parts of water. The residue consists essentially of about 55 parts of divinyl disulfide (approximately 85% of theoretical yield), an orange-colored solid that melts at 20° C. and boils at a temperature of from 180 to 183° C. with incipient decomposition. Analysis calculated from

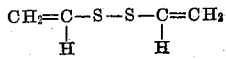

S, 54.1%; found, 51.9%.

Example II

Place 175 parts of trimethylbenzyl ammonium hydroxide and 400 parts of anhydrous methanol in a suitable container and agitate until the hydroxide dissolves in the methanol. Adjust the temperature of the solution to about 20° C. and add 100 parts of beta,beta'-dichlorodiethyl disulfide with agitation, continuing the agitation for about 15 hours after the last of the disulfide has been added. At the end of this time, remove the methanol by vacuum distillation. Cool the residue at a temperature of less than 20° C. and wash with three portions of ice water, each of which consists of about 150 parts of water. The residue consists essentially of about 50 parts (approximately 80% of theoretical yield) of divinyl disulfide, melting at a temperature of about 20° C. and boiling at a temperature of about 180–183° C. with incipient decomposition.

Example III

To 300 parts of anhydrous ethylene glycol heated to a temperature of about 50° C. add, with agitation, 180 parts of trimethylbenzyl ammonium hydroxide and continue the agitation until the hydroxide dissolves in the ethylene glycol. While maintaining the temperature at 50° C., slowly add 100 parts of beta,beta'-dichlorodiethyl disulfide and continue agitation for about 15 hours after the last of the disulfide has been added. At the end of this time, cool the solution to a temperature of less than 20° C. and then add 300 parts of ice water with agitation. Filter in order to obtain a solid residue which consists essentially of about 45 parts of divinyl disulfide.

The beta,beta'-dihalodiethyl disulfides used as the starting materials for the present invention have the general formula

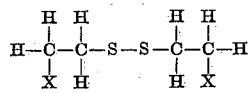

wherein X stands for a halogen atom taken from the group consisting of chlorine, bromine and iodine. Among the compounds that may be used with satisfactory results are beta,beta'-dibromodiethyl disulfide, beta,beta'-dichlorodiethyl disulfide, beta,beta'-diiododiethyl disulfide, beta-bromo,beta'-chlorodiethyl disulfide, etc. Mixtures of two or more such disulfides may be used if desired. The beta,beta'-dihalodiethyl disulfides are well-known compounds that can be prepared by known methods such as those described by G. M. Bennett (J. Chem. Soc., vol. 119, page 418, 1921). For example, beta,beta'-dichlorodiethyl disulfide can be prepared by first oxidizing monothioethylene glycol in aqueous solution with hydrogen peroxide, ferric chloride or sodium hypobromite in order to form a dihydroxy disulfide and by then heating the dihydroxy disulfide on a water bath in admixture with from 4 to 5 parts, per part of disulfide, of a solution of concentrated hydrochloric acid in order to form beta, beta'-dichlorodiethyl disulfide.

In preparing divinyl disulfide, the beta,beta'-dihalodiethyl disulfide should be reacted with a hydroxide taken from the group consisting of alkali metal, alkaline earth metal and quaternary ammonium hydroxides. Among the hydroxides that can be used either alone or in admixture are calcium hydroxide, barium hydroxide, sodium hydroxide, potassium hydroxide, benzyltrimethyl ammonium hydroxide, trimethylphenyl ammonium hydroxide, cetyldimethylbenzyl ammonium hydroxide, etc.

The optimum yield of divinyl disulfide is obtained when the beta,beta'-dihalodiethyl disulfide is reacted with substantially two mols of hydroxide per mol of disulfide, although greater or lesser amounts of hydroxide may be used if desired. When less than about two mols of hydroxide per mol of beta,beta'-dihalodiethyl disulfide are used, incomplete conversion results and the yield of product is correspondingly low. If more than about two mols of hydroxide per mol of disulfide are used, the yield will also decrease, the drop-off being rather sharp. Therefore, it is preferable to avoid the use of more than a slight excess of hydroxide. Generally speaking, and provided that the proper reaction conditions are employed, an appreciable yield of divinyl disulfide will be obtained when from 1.5 to 2.5 mols of hydroxide per mol of beta,beta'-dihalodiethyl disulfide are used.

Divinyl disulfide is formed with appreciable yield only when the reaction between the beta,beta'-dihalodiethyl disulfide and the hydroxide occurs in solution in a non-reactive solvent in which both ingredients are at least partially soluble. Generally speaking, both the sulfides and hydroxides are soluble to an appreciable extent in and non-reactive with the lower aliphatic alcohols and glycols containing from 1 to 4 carbon atoms and it is therefore preferable to use a compound from this class as the solvent. However, other solvents or mixtures of two or more solvents in which the disulfide and hydroxide are at least partially soluble may be used if desired. Satisfactory solvents include compounds such as methanol, ethanol, tertiary butyl alcohol, ethylene glycol, propylene glycol, dioxane, dimethyl formamide, morpholine, etc. It is preferable, but not necessary, to use an excess of solvent, the reaction being easier to control when an excess of solvent is present.

A comparatively wide range of temperatures may be used in preparing divinyl disulfide although the reaction will generally proceed more smoothly at room temperatures. When temperatures of from 10° to 80° C. are used, a high yield of divinyl disulfide will be obtained with a reasonably satisfactory reaction rate. If desired, temperatures lower than 10° C. may be used. Thus, for example, even at a temperature of —20° C., the reaction will proceed at a slow but still reasonable rate. Temperatures in excess of 80° C. may be used if desired but the reaction will generally be more difficult to control and a lower yield of divinyl disulfide will generally be obtained. The use of temperatures in excess of 150° C. should be avoided. Preferably, but not necessarily, the reaction between the beta,beta'-dihalodiethyl disulfide and the hydroxide is initiated under substantially anhydrous conditions in order to improve the yield of product.

In order to prevent diminution of yield, the divinyl disulfide should be separated from the solvent as soon as possible after completion of the reaction. The end point of the reaction can be easily determined by titrating the solution at periodic intervals as the reaction proceeds in order to measure the residual alkali content. When no appreciable decrease in alkali content can be detected, the reaction is substantially complete and the divinyl disulfide should then be separated from the solvent. This can be easily accomplished through the use of various conventional techniques. For example, if the solvent has a sufficiently low vapor pressure, the divinyl disulfide can be separated by distilling off the solvent in vacuo or, if the vapor pressure of the solvent is too high to permit satisfactory vacuum distillation, ice water in molar excess of the amount of solvent used may be added, in which case the divinyl disulfide will be suspended in the resultant aqueous solution and can be recovered by filtration. In washing or recovering divinyl disulfide, cold water such as ice water should preferably be used in order to prevent a decrease in yield.

Divinyl disulfide is a valuable monomeric material that can be converted into ethylene sulfonyl chloride by the process disclosed in copending Park application Serial No. 343,518 filed March 19, 1953. It is also possible to prepare a wide variety of polymers from this monomer as shown by the following examples.

POLYMERIZATION OF DIVINYL DISULFIDE

Example IV

Place 300 parts of anhydrous ethanol in a suitable vessel fitted with a reflux condenser. Add 100 parts of divinyl disulfide and 0.2 part of acetyl peroxide and heat to reflux in an atmosphere of nitrogen. Continue refluxing for about 48 hours and then evaporate the solvent by vacuum distillation. A homopolymer of divinyl disulfide is formed as a result of this reaction, the polymer being infusible and insoluble in benzene, diethyl ether, water or chloroform.

Example V

Place 100 parts of styrene, 5 parts of divinyl disulfide and 0.1 part of benzoyl peroxide in a suitable container and heat the resultant solution at 90° C. for 24 hours under an atmosphere of nitrogen and then for an additional 24 hours at a temperature of 180° C. A copolymer of styrene and divinyl disulfide is formed as a result of this reaction. The copolymer is infusible and is substantially insoluble in water, ethanol, diethyl ether and chloroform.

Divinyl disulfide can be copolymerized with many organic compounds having an ethylenic double bond. Among the compounds copolymerizable with divinyl disulfide are mono-olefins such as ethylene, isobutylene, styrene, etc., conjugated dienes such as 1,3-butadiene, etc., vinyl esters such as vinyl acetate, etc., vinylidene compounds such as vinylidene chloride, etc., esters of a-methylene monocarboxylic acids such as methyl methacrylate, methyl acrylate, isobutyl acrylate, etc., unsaturated anhydrides such as maleic anhydride, etc. and other vinyl compounds such as vinyl chloride, acrylonitrile, etc. Mixtures of two or more such co-monomers may be used if desired. Both the homopolymers and copolymers can be prepared by conventional mass, solvent, emulsion or suspension polymerization processes. Since divinyl disulfide is sensitive to the presence of water, it is preferable to conduct the polymerization reaction under anhydrous conditions using a mass or solvent polymerization process, a much better yield and a more accurate control of the reaction being obtainable. The polymerization reaction should preferably be conducted in the absence of air or oxygen although this is not absolutely necessary.

Generally speaking, the copolymers of divinyl disulfide may contain from 0.1 to 95% divinyl disulfide and, correspondingly, from 99.9 to 5% of the other monomer or monomer mixture. Divinyl disulfide is particularly useful as a cross-linking agent when used in the amount of from 0.1 to 5 parts of divinyl disulfide per 100 parts of comonomer.

Preferably, but not as a matter of necessity, a polymerization catalyst should be used to accelerate the reaction. Any of the well-known polymerization catalysts may be used, including peroxy compounds such as benzoyl peroxide, acetyl peroxide, diethyl peroxide, tertiary butyl peroxide, diethyl diperphthalate, ammonium persulfate, etc., azo compounds such as diethyl-a,a'-azodiisobutyrate, a,a'-azodiisobutyramide, 1,1'-azodicyclohexanecarbonitrile, etc. Preferably, from about 0.005 to 0.5 part of catalyst per 100 parts of monomer or monomer mixture should be used. A wide variety of operating temperatures may be used in carrying out the polymerization reaction, satisfactory results being obtainable within the range of from about 20° to 200° C.

If desired, other conventional modifiers such as redox agents, chain-transfer agents, etc. may be used to regulate molecular weight and to direct the course of the reaction.

As a general rule, both the polymers and copolymers of divinyl disulfide will be infusible and substantially insoluble in conventional organic solvents. They are useful for a wide variety of purposes such as the preparation of molding compositions, ion-exchange resins, etc.

What is claimed is:

1. A process for preparing divinyl disulfide which consists of admixing under anhydrous conditions 1 molar proportion of a disulfide having the formula:

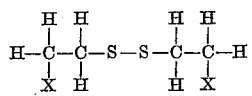

wherein X is a halogen atom from the group consisting of chlorine, bromine, and iodine and substantially 2 molar proportions of a hydroxide of the group consisting of alkali metal, alkaline earth metal and quaternary ammonium hydroxides in a solvent of the group consisting of anhydrous monohydric aliphatic alcohols containing 1–4 carbon atoms and anhydrous alkylene glycols contains 2–4 carbon atoms, maintaining said reaction mixture at a temperature of 10–80° C. until the formation of divinyl disulfide is substantially complete and substantially immediately thereafter recovering the divinyl disulfide from the reaction solvent.

2. A process as in claim 1 wherein the disulfide is beta,beta′-dichlorodiethyl disulfide.

3. A process as in claim 2 wherein the hydroxide is an alkali metal hydroxide.

4. A process as in claim 3 wherein the alkali metal hydroxide is potassium hydroxide.

5. A process as in claim 2 wherein the hydroxide is a quaternary ammonium hydroxide.

6. A process as in claim 5 wherein the quaternary ammonium hydroxide is trimethylbenzyl ammonium hydroxide.

References Cited in the file of this patent

UNITED STATES PATENTS

| | | |
|---|---|---|
| 2,474,859 | Perkins | July 5, 1949 |
| 2,728,750 | Tobolsky | Dec. 27, 1955 |

FOREIGN PATENTS

| | | |
|---|---|---|
| 660,918 | Great Britain | Apr. 7, 1949 |

OTHER REFERENCES

Bales et al.: J. Chem. Soc., 121, 2137–9 (1922).
Bales et al.: J. Chem. Soc., 123, 2486–9 (1923).
Norrich et al.: Proc. Royal Soc. (1937), A163, pp. 205–220.